US008955636B2

(12) United States Patent
Kuittinen et al.

(10) Patent No.: US 8,955,636 B2
(45) Date of Patent: Feb. 17, 2015

(54) ROCK DRILLING RIG AND METHOD FOR TRANSMISSION OF ROCK DRILLING RIG

(75) Inventors: Jarno Kuittinen, Tampere (FI); Juha Piipponen, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 4 days.

(21) Appl. No.: 13/883,226

(22) PCT Filed: Nov. 1, 2011

(86) PCT No.: PCT/FI2011/050958
§ 371 (c)(1),
(2), (4) Date: May 2, 2013

(87) PCT Pub. No.: WO2012/059642
PCT Pub. Date: May 10, 2012

(65) Prior Publication Data
US 2013/0228377 A1    Sep. 5, 2013

(30) Foreign Application Priority Data

Nov. 4, 2010   (FI) .................................... 20106157

(51) Int. Cl.
| | |
|---|---|
| *B60K 6/12* | (2006.01) |
| *B60K 6/20* | (2007.10) |
| *B60K 25/02* | (2006.01) |
| *E21B 7/02* | (2006.01) |
| *E21B 41/00* | (2006.01) |
| *B60L 1/00* | (2006.01) |
| *B60L 11/18* | (2006.01) |

(52) U.S. Cl.
CPC ................ *E21B 7/025* (2013.01); *E21B 41/00* (2013.01); *B60L 1/003* (2013.01); *B60L 11/18* (2013.01); *B60L 2200/40* (2013.01); *Y02T 10/7005* (2013.01)
USPC .......................................... 180/306; 180/165

(58) Field of Classification Search
CPC ...... B60K 25/00; B60K 25/02; B60K 41/008; B60K 2006/08; B60K 2006/12
USPC ........... 180/305, 306, 307, 308, 165; 280/762
See application file for complete search history.

(56) References Cited

U.S. PATENT DOCUMENTS

| | | | | |
|---|---|---|---|---|
| 5,495,912 A | * | 3/1996 | Gray et al. ..................... | 180/165 |
| 7,232,192 B2 | * | 6/2007 | Teslak et al. .................. | 303/152 |
| 7,900,712 B2 | * | 3/2011 | Muona et al. ................... | 173/4 |
| 2001/0003317 A1 | * | 6/2001 | Klemm ........................ | 173/222 |
| 2002/0092687 A1 | | 7/2002 | Forster | |
| 2006/0120892 A1 | | 6/2006 | Muona | |

FOREIGN PATENT DOCUMENTS

| | | |
|---|---|---|
| CN | 2555448 | 6/2003 |
| CN | 201013235 | 1/2008 |

(Continued)

*Primary Examiner* — John Walters
(74) *Attorney, Agent, or Firm* — Corinne Gorski

(57) ABSTRACT

A rock drilling rig and to a method for transmission thereof is provided. The rock drilling rig includes a carriage that is movable by drive equipment in a mine. The rock drilling rig includes a hydraulic drilling system for which pressure energy is generated by a hydraulic pump. The rock drilling rig is electrically driven and includes an electric motor that is connected to drive both the drive equipment and the hydraulic drilling system. The mechanical drive transmission included in the drive equipment and the hydraulic pump of the hydraulic drilling system may be connected and disconnected independently of one another by means of clutches.

7 Claims, 5 Drawing Sheets

(56) References Cited

FOREIGN PATENT DOCUMENTS

| | | |
|---|---|---|
| CN | 201013236 | 1/2008 |
| JP | 5-47096 | 6/1996 |
| JP | 2006117341 A | 5/2006 |
| SU | 1108200 A1 | 8/1984 |
| WO | 2010061058 A1 | 6/2010 |

* cited by examiner

ROCK DRILLING RIG AND METHOD FOR TRANSMISSION OF ROCK DRILLING RIG

RELATED APPLICATION DATA

This application is a §371 National Stage Application of PCT International Application No. PCT/FI2011/050958 filed Nov. 1, 2011 claiming priority of Finnish Application No. 20106157, filed Nov. 4, 2010.

BACKGROUND OF THE INVENTION

The invention relates to an electrically driven rock drilling rig, which comprises a mobile carriage, on which there is arranged one or more drilling booms with drilling units. The carriage is moved by means of drive equipment, which includes an electric motor and mechanical drive transmission means for transmitting driving power to the wheels. The rock drilling rig also comprises a hydraulic system for drilling, in which pressure energy generated by a hydraulic pump drives drilling actuators.

Further, the invention relates to a method for transmission of a rock drilling rig. The field of the invention is described in more detail in the preambles of the independent claims of the application.

In mines there are used rock drilling rigs, by which boreholes are drilled at planned drilling sites. When drilling of the boreholes is completed, the mining vehicle is transferred to a next drilling site for drilling a new drilling fan or face. In underground mines, in particular, it is advantageous to perform the transfer drive by means of power produced by an electric motor. Typically, rock drilling rigs employ hydraulic drilling actuators which are driven by pressure energy acting in the hydraulic drilling system. The hydraulic pressure is provided by a hydraulic pump which is driven by a specific electric motor in the electrically driven rock drilling rigs. Current, electrically driven transmission systems of the rock drilling rigs are found to take a lot of space on the carriage, and moreover, they are expensive.

BRIEF DESCRIPTION OF THE INVENTION

The object of the present invention is to provide a novel and improved rock drilling rig and a method for implementing transmission thereof.

The rock drilling rig of the invention is characterized in that the hydraulic pump of the hydraulic system for drilling and the mechanical drive transmission of the drive equipment are arranged for being driven by at least one common electric motor; and that the hydraulic system for drilling and the mechanical drive transmission are each independently connectable and disconnectable by clutches to be driven and not to be driven by the electric motor.

The method of the invention is characterized by transmitting driving force from a common electric motor to a hydraulic pump of a hydraulic drilling system and to mechanical drive transmission of drive equipment; and by controlling independently, through clutches, the connection and disconnection of the hydraulic system for drilling and the mechanical drive transmission to be driven by the common electric motor.

An idea of the invention is that the same electric motor drives both the mechanical drive transmission and the hydraulic pump of the hydraulic drilling system. In addition, the power transmission from the common electric motor to the drive transmission and the hydraulic pump is independently connectable and disconnectable by means of clutches.

The invention has an advantage that the same electric motor is utilized both for transfer drive and for generating hydraulic pressure. In that case no specific electric motors are needed for the drive equipment and for the drilling hydraulics. Therefore, the structure of the transmission system may be simpler and the price may be lower. Further, the use of the common electric motor facilitates the placement of components belonging to the transmission system onto the carrier, because there are fewer, bulky electric motors. Yet another possible advantage is that the running of the electric motor may be controlled better than before according to load, and further, it is also possible to avoid excess running of the drive equipment and the drilling hydraulics, when the operation of the rock drilling rig does not require them to be on. Thus, it is possible to save energy, which is an important matter, especially in battery-driven rock drilling rigs. Cost saving achieved by energy saving as a whole is also a significant advantage.

The basic idea of an embodiment is that a first end of a rotor in an electric motor is arranged to drive the drive transmission and a second end of the rotor is arranged to drive a hydraulic pump of the hydraulic drilling system. This application provides a transmission solution that takes only little space.

The basic idea of an embodiment is that the transmission system comprises a dividing gear having one or more input axles, to which a common electric motor is connected. One or more hydraulic pumps of the hydraulic drilling system are connected to an output axle of the dividing gear, as are the transmission parts of the mechanical drive transmission. The dividing gear may be arranged to transmit the driving output as such to the components connected thereto, or it may have different transmissions for each component connected thereto.

The basic idea of an embodiment is that the rock drilling rig comprises two or more electric motors, each of which being common to the drive equipment and the hydraulic drilling system. The electric motors may be mutually connected in series or they may be connected to the input axles of the dividing gear. Thanks to this application it is possible to employ either one or more electric motors simultaneously according to a loading need. The electric motors may be the same or different as to their efficiency and properties.

The basic idea of an embodiment is that the power of the electric motor common to the drilling hydraulics and the drive transmission is rated in view of the power required by the drilling hydraulics. The power required for driving is clearly lower than the power required for drilling hydraulics, so the electric motor is overrated for driving. The electric motor may be run at partial power during driving.

The basic idea of an embodiment is that the power and the rotation speed of the electric motor common to the drilling hydraulics and the drive transmission are controlled by means of a frequency converter. Thanks to an inverter drive, the electric motor may have a so-called soft drive.

The basic idea of an embodiment is that the electric motor common to the drilling hydraulics and the drive transmission is run at constant rotation speed at least when the electric motor drives only the hydraulic pump.

The basic idea of an embodiment is that the hydraulic pump of the drilling hydraulics and the drive transmission are connectable to be driven by the common electric motor nonsimultaneously. The control unit of the rock drilling rig may have a control strategy, according to which it switches off the hydraulic pump of the drilling hydraulics for the duration of a transfer drive, whereby energy is not wasted for generation of the hydraulic pressure during the transfer drive. Correspondingly, when the transfer drive is completed and the rock drilling rig is positioned at a drilling site, the mechanical drive transmission may be released off use during the drilling by means of a clutch. Thanks to this application, energy is not wasted for a function that is not in use, and on the other hand, the whole capacity of the common electric motor may be used for the primary function.

The basic idea of an embodiment is that the hydraulic pump of the drilling hydraulics and the drive transmission are connectable to be driven by the common electric motor nonsimultaneously and also simultaneously. This application may be utilized, for instance, during positioning of the rock drilling rig, when the carriage is moved, and at the same time the boom may be driven in a desired direction, for instance. Further, during the transfer drive it is possible to turn the boom, if driving takes place in narrow mine galleries, for instance.

The idea of an embodiment is that the rock drilling rig comprises at least one compressor. The driving force required by the compressor is generated by an electric motor that is common to the drive equipment and the drilling hydraulics. The compressor may be switched on and off by means of a clutch. Thanks to this application, the compressor need not have a specific, separate electric motor, but the common electric motor is utilized again. During a normal transfer drive the compressor may be switched off use.

The idea of an embodiment is that for downhill drive the rock drilling rig is provided with an arrangement, in which potential energy is converted to pressure energy. In downhill drive of long duration the potential energy of the carriage converts to kinetic energy. The carriage may be decelerated by transmitting the rotary motion through mechanical transmission to a dividing gear or the like, wherefrom the rotary motion may be further transmitted to the electric motor that may be used as a generator. Further, for the duration of the downhill drive it is possible to switch on one or more hydraulic pumps of the drilling hydraulics, and when necessary, the compressor may also be switched on. These switched-on devices and systems may receive energy released in downhill drive, whereby the dynamics of the downhill drive of long duration may be improved without overloading the conventional decelerating systems.

The idea of an embodiment is that the driving energy of the rock drilling rig is obtained from an energy storage. The energy storage may comprise one or more batteries.

The idea of an embodiment is that the driving energy of the rock drilling rig is obtained from the electric system of the mine. In that case the rock drilling rig is equipped with a supply cable and a reeling device.

BRIEF DESCRIPTION OF FIGURES

Some embodiments of the invention are described in greater detail in the attached drawings, in which.

In the figures, some embodiments of the invention are shown simplified for the sake of clarity. Like reference numerals refer to like parts in the figures.

DETAILED DESCRIPTION OF SOME EMBODIMENTS OF THE INVENTION

Figure 1:
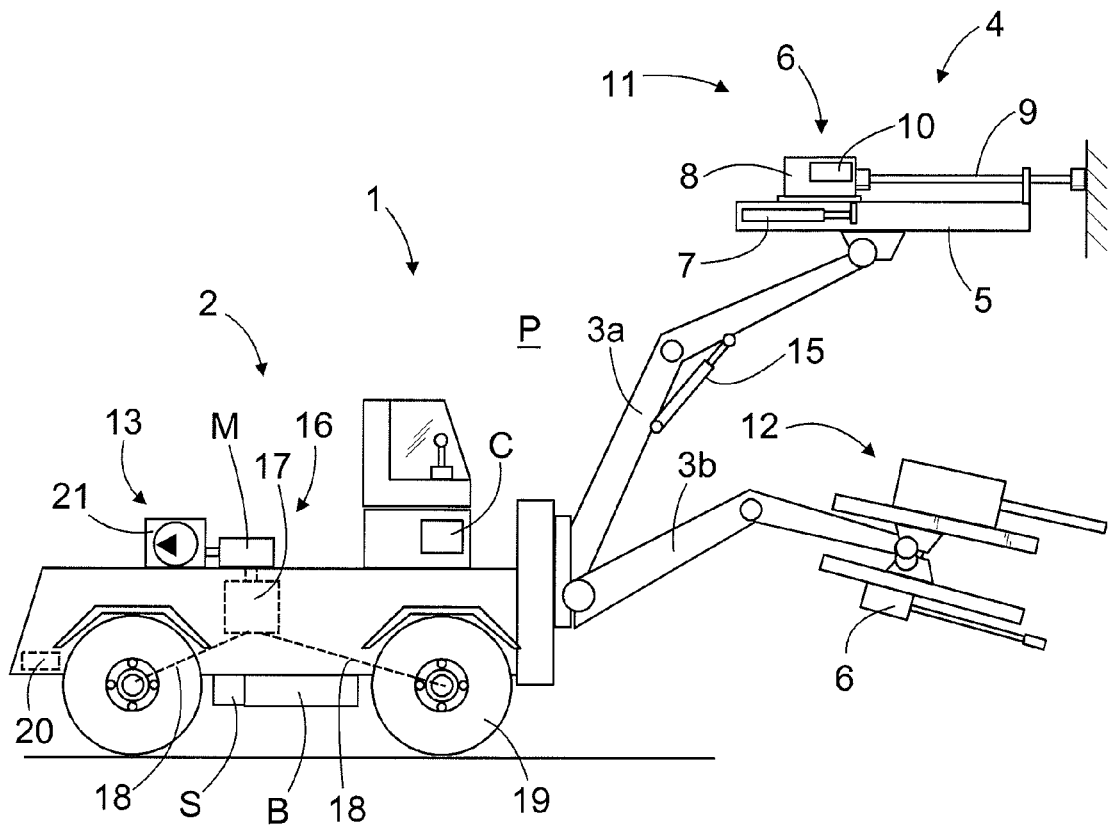
FIG. 1 shows schematically an electrically driven rock drilling rig positioned at a drilling site in a mine.

FIG. 1 shows a rock drilling rig 1 comprising a movable carriage 2 which is provided with one or more drilling booms 3a, 3b equipped with a drilling unit 4. The drilling unit 4 may comprise a feed beam 5 provided with a rock drilling machine 6 that may be moved on the feed beam 5 by means of a feed device 7. The rock drilling machine 6 may comprise a percussion device 8 for generating impact pulses on a tool 9, and a rotating device 10 for rotating the tool 9. Further, it may include a flushing device. The boom 3a shown in the figure and the drilling unit 4 arranged thereto are intended for drilling boreholes in a face 11 of a tunnel or a corresponding drilling site. Alternatively, the boom and the drilling unit thereon may be designed for drilling fanform boreholes in the ceiling and walls of a rock cavern. Further, the rock drilling rig 1 may comprise a boom 3b provided with a bolting device 12 that also has a rock drilling machine 6. The rock drilling rig 1 comprises a hydraulic system 13 for drilling, which includes a hydraulic pump 21, hydraulic channels, a tank and necessary control means, such as valves and the like. At least boom actuators 15 necessary for moving the drilling booms 3a, 3b, the percussion device 8, the rotating device 10 and the feed device 7 of the rock drilling machine 6 may be connected to the hydraulic drilling system 13. The hydraulic pump 21 is driven by an electric motor M.

The rock drilling rig 1 also comprises one or more control units C, which is arranged to control the systems of the rock drilling rig 1. The control unit C may be a computer or a corresponding control device comprising a processor, a programmable logic or any other control device suitable for the purpose, to which it is possible to set at least one control strategy, according to which it carries out control independently or in cooperation with the operator.

The rock drilling rig 1 is positioned at a drilling site P for drilling one or more boreholes. Typically, the drilling is performed according to a pre-drafted drilling pattern. When the tasks assigned for the drilling site P are completed, the rock drilling rig 1 is transfer-driven away from the drilling site P to a new drilling site or somewhere else, for instance to be serviced. The rock drilling rig 1 is provided with drive equipment 16 which does not include a combustion engine, i.e., it is combustion-engine-free. Whereas the drive equipment 16 includes mechanical transmission, by which the power produced by the electric motor M is transmitted to one or more wheels 19. The electric motor M is in common with the hydraulic drilling system 13. The electric motor M may be coupled to a gearbox 17, wherefrom rotating power is transmitted through shafts or corresponding transmission elements 18 to the wheels. The energy required in transfer drive may be charged to an energy storage B, which may be a battery, for instance.

The electric motor M may also be used for deceleration. In deceleration of long duration, the electric motor M may serve as a generator and convert kinetic energy of the carriage 2 to electric energy when driving down the drive ramps in the mine, for instance. Generated electric energy may be charged to an energy storage B and thus recovered. Surplus electric energy, which cannot be utilized, may be converted to thermal energy in a brake resistor 20. Further, the rock drilling rig 1 may be equipped with a control device S, which may comprise a frequency converter whereby the rotation of the electric motor M may be controlled steplessly during the use of both the drive equipment and the hydraulic pump. The electric drive system may further comprise other necessary electric control devices for controlling electric currents. In this application the frequency converter refers to a control means, by which the revolving speed of the electric drive motor may be controlled in a stepless manner. The frequency converter may be an inverter or it may be a DC/AC converter, which controls the running of the electric motor.

Figure 2:
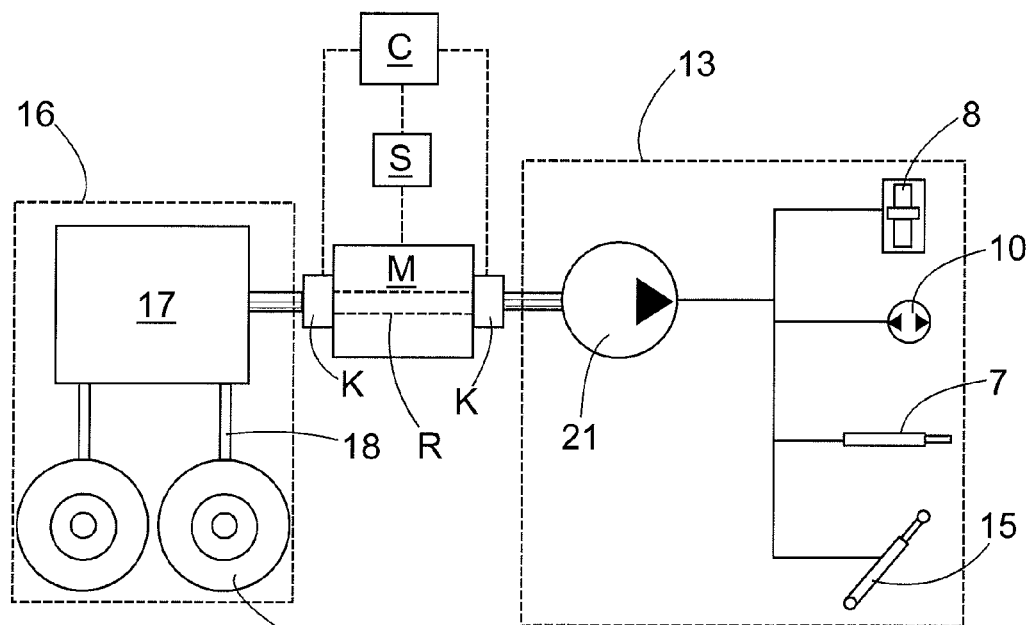
FIG. 2 shows schematically a transmission system, in which a rotor of one common electric motor is connected to transmit driving power to a mechanical drive transmission and to a hydraulic pump of a hydraulic system for drilling.

FIG. 2 shows a transmission arrangement, which may comprise just one single electric motor M, which generates the required drive power for the mechanical drive transmission 16 and the hydraulic pump 21 of the hydraulic drilling system 13. A first end of a rotor R in the electric motor M may be coupled through a clutch K to the gearbox 17 of the drive equipment 16. A second end of the rotor R may be coupled through the clutch K to the hydraulic pump 21. This application enables an extremely compact transmission system. The control unit C may control the control device S, which in turn may control the electric motor M. The control unit C may further control the clutches K such that, when needed, the driving power may be transmitted alternately either to the drive equipment 16 or the drilling hydraulics 13, or when needed it is possible to transmit power to both simultaneously.

Figure 3:
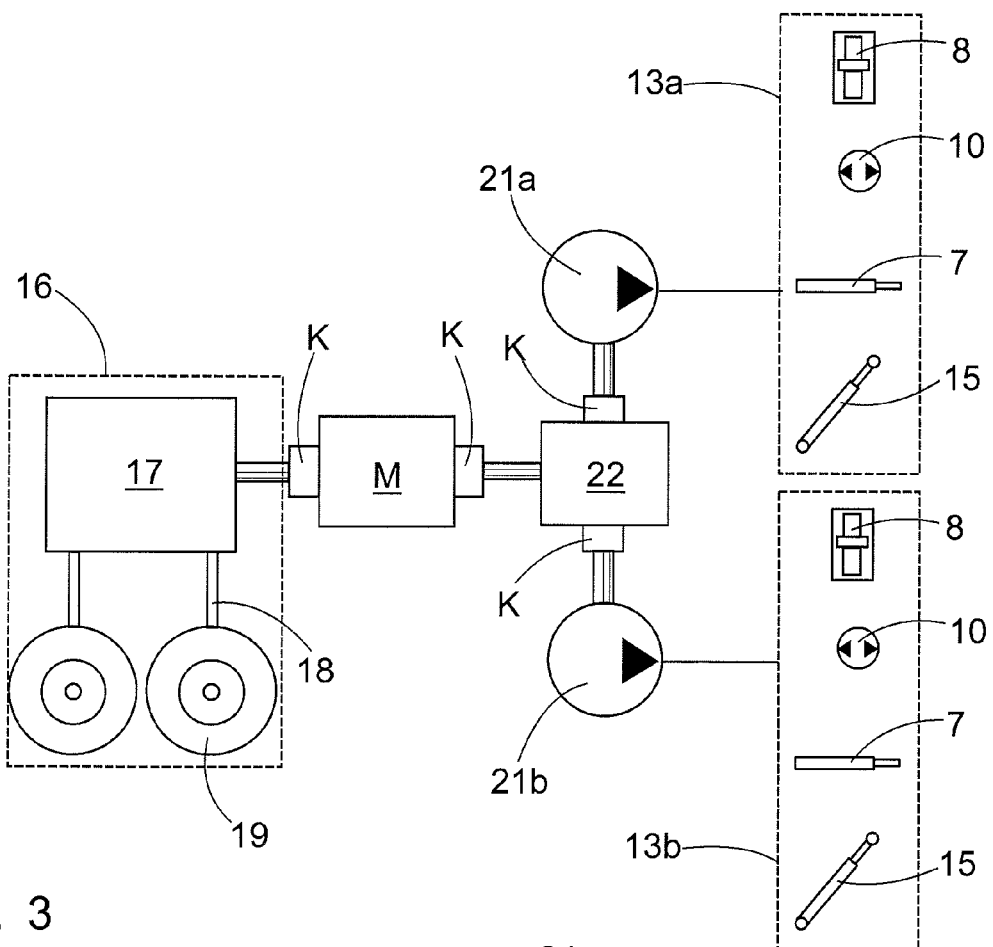
FIG. 3 shows schematically a transmission arrangement, in which one common electric motor is arranged to drive the drive transmission and two hydraulic pumps.

The application shown in FIG. 3 is otherwise similar to the one shown in FIG. 2, except that there are two hydraulic systems 13a and 13b for drilling. This solution may be applicable, for instance, when there are two drilling booms. Each drilling boom and a drilling unit thereon may have a specific hydraulic drilling system. The electric motor M may be arranged to operate, through a clutch, a dividing gear 22, wherefrom driving power may be transmitted through clutches to the hydraulic pumps 21a and 21b. By means of the clutches K the dividing gear 22 may be disconnected, if necessary, from the electric motor M and further the hydraulic pumps 21a and 21b may be switched on and off, for instance, in accordance with the drilling boom to be used at each particular time. The dividing gear 22 may be arranged to transmit the rotary force of the electric motor M with predetermined transmission to the hydraulic pumps 21a, 21b. The transmission to the hydraulic pumps 21a and 21b may be equal or it may be different, for instance, depending on the extent and power need of the hydraulic drilling systems.

Figure 4:
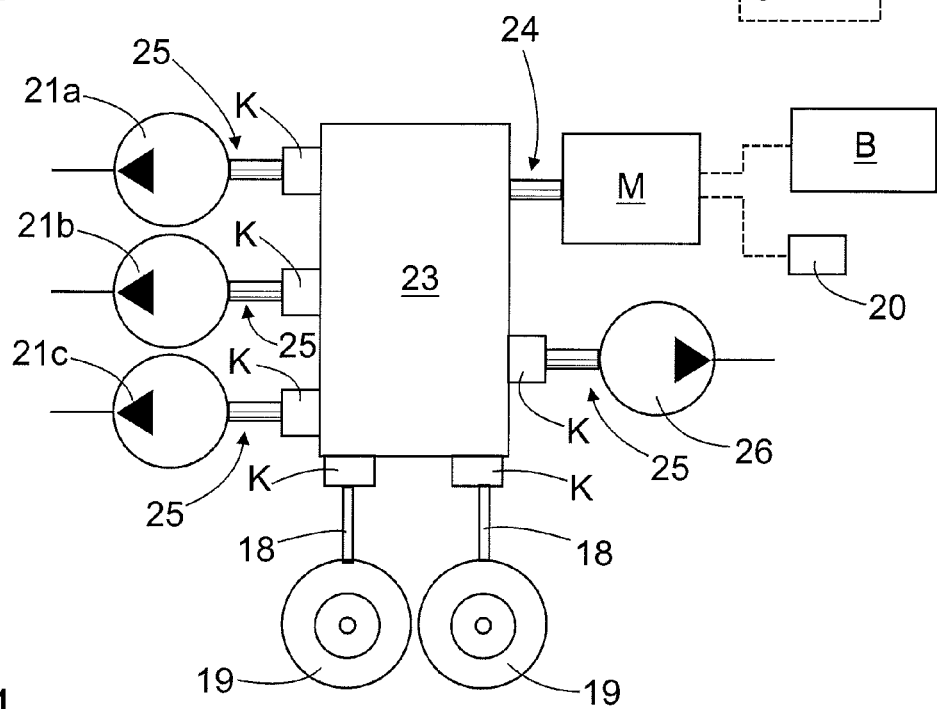
FIG. 4 shows schematically a transmission arrangement, in which the electric motor is connected to a diving gear, wherefrom the driving power is distributed to the drive transmission, several hydraulic pumps and to a compressor.

FIG. 4 shows an application in which the electric motor M is connected to an input axle 24 of the dividing gear 23. The dividing gear 23 transmits through the clutches K driving power to output axles 25 and further to the hydraulic pumps 21a to 21c of the drilling hydraulics, and possibly also to the compressor 26. In the output axle 25 of the dividing gear 23 there may further be arranged another supplementary device such as a flushing water pump or a reeling device. The transmission arrangement of FIG. 4 may be used in downhill drive of long duration such that from the wheels 19 driving power is transmitted to the dividing gear 23 and further to the electric motor M, which serves as a decelerator and simultaneously generates electric power to charge the energy storage B. Surplus electric power may be converted to heat by means of a brake resistor 20. Further, one or more hydraulic pumps 21 and the compressor 26 may be connected to operate during the downhill drive by means of the clutches K.

Figure 5:
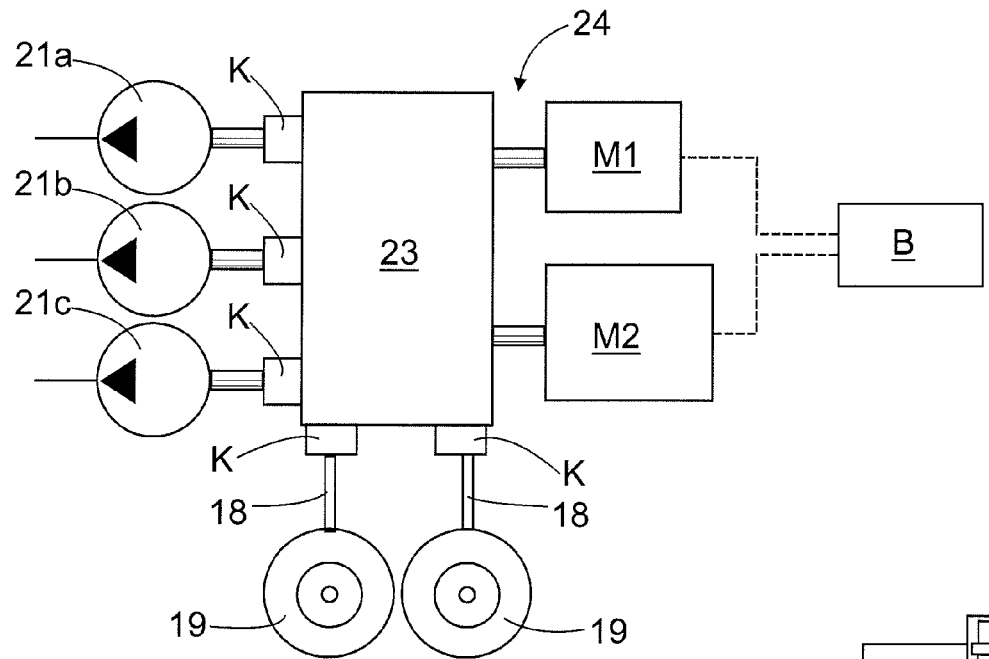
FIG. 5 shows schematically a transmission arrangement, which comprises two common electric motors that are arranged, through the dividing gear, to drive the hydraulic pumps and the drive transmission.

The application shown in FIG. 5 differs from the solution of FIG. 4 in that the dividing gear 23 comprises two input axles 24 to which the electric motors M1 and M2 are connected. The electric motors M1 and M2 may be different or equal in efficiency. The electric motors M1 and M2 common to the drive equipment and the drilling hydraulics may be connected to operate nonsimultaneously or simultaneously, depending on the loading, for instance.

Figure 6:
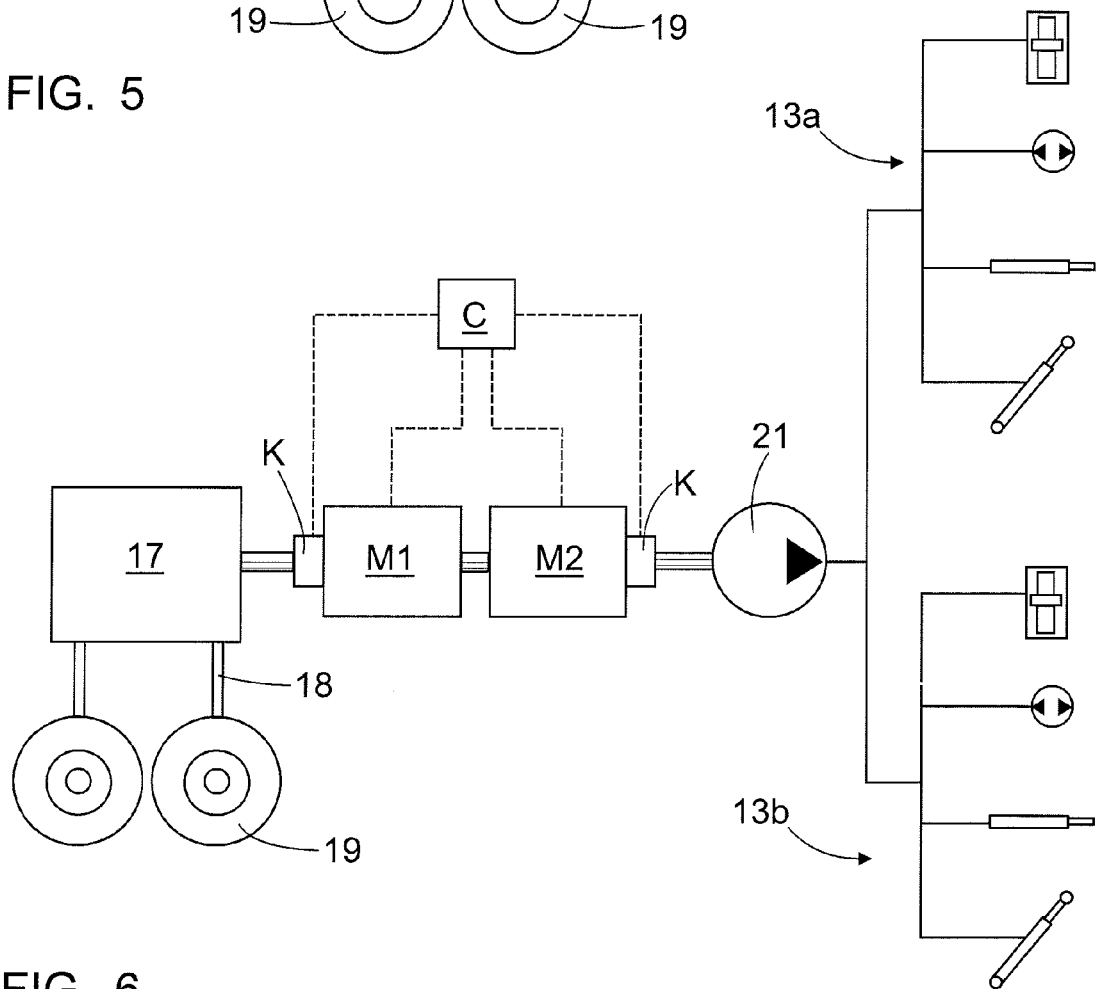
FIG. 6 shows schematically a transmission arrangement, in which two common electric motors coupled in series are connected to drive the drive transmission and one common hydraulic pump.

FIG. 6 shows an application, in which two common electric motors M1 and M2 are coupled in series and they may be connected to operate nonsimultaneously or simultaneously. The rotors of the electric motors M1 and M2 may be interconnected mechanically with a non-slip connection. Further, in the arrangement of FIG. 6 one hydraulic pump 21 is arranged to provide the required pressure in pressure fluid for two hydraulic circuits 13a, 13b for drilling.

Figure 7:
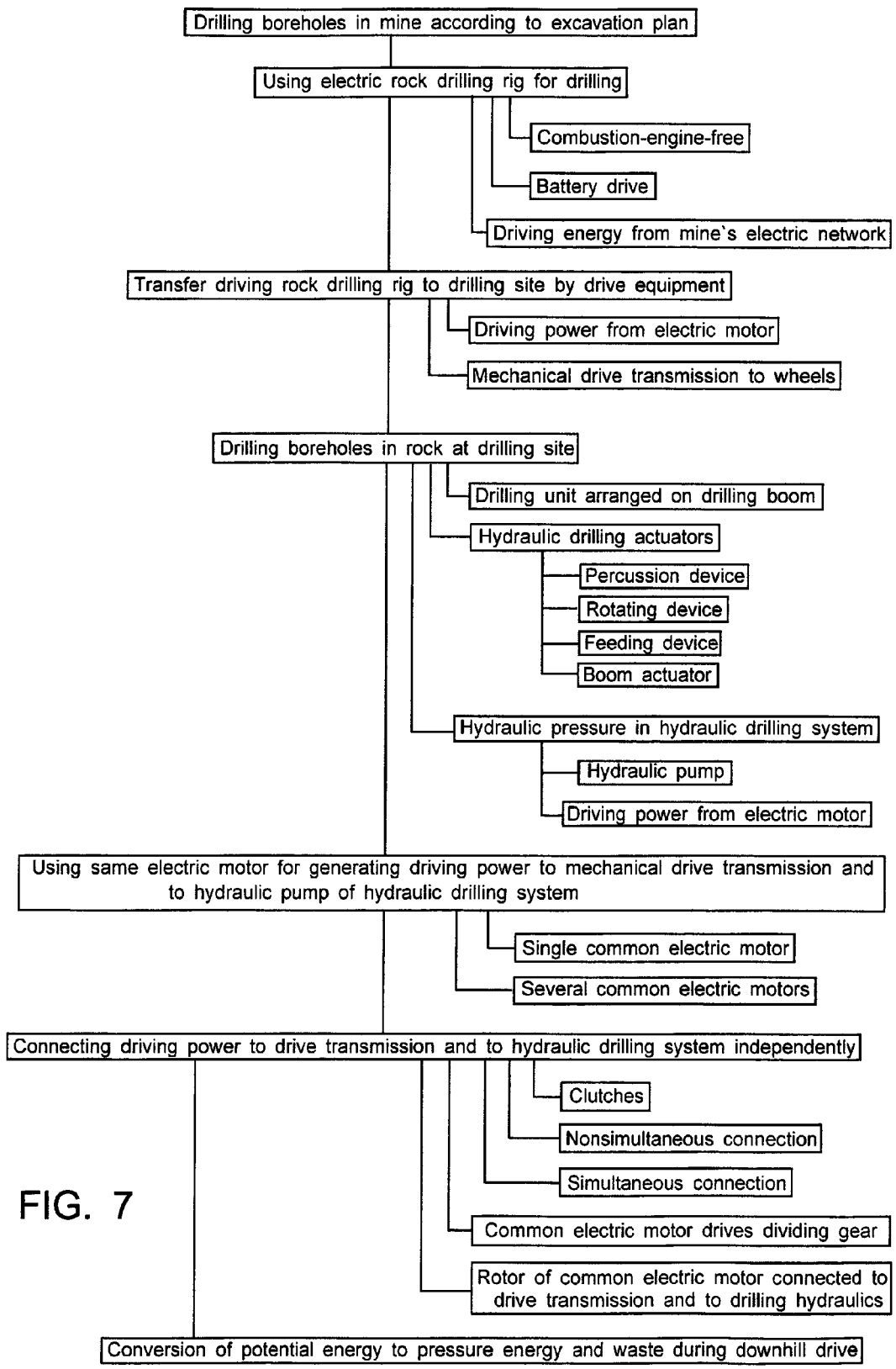
FIG. 7 is a diagram of operations and features related to the invention.

FIG. 7 shows, by means of a simple diagram, features and characteristics relating to the operation and use as well as to transmission of a rock drilling rig. These details have already been discussed above in this application.

Figure 8:
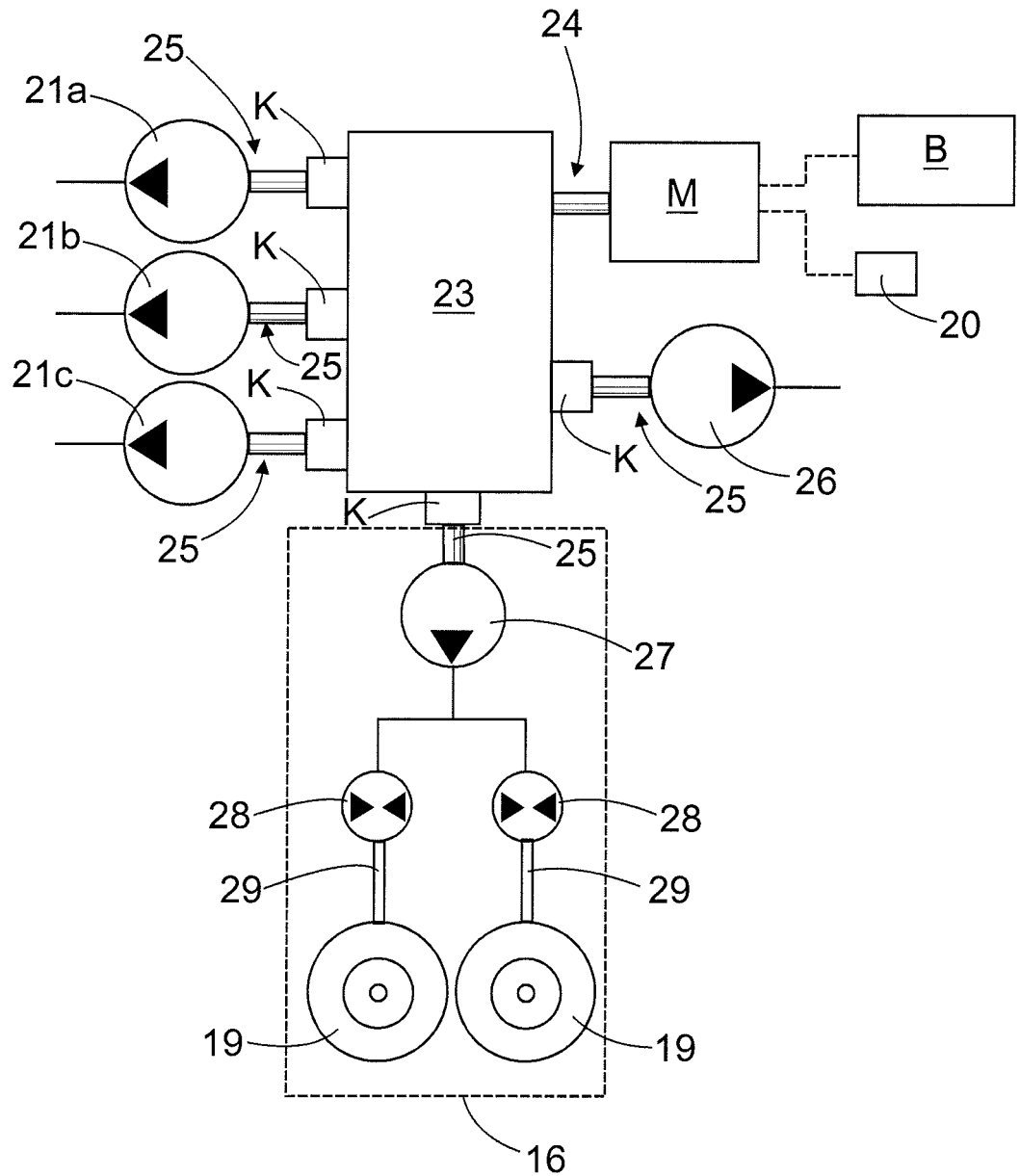
FIG. 8 shows schematically yet another alternative transmission arrangement.

For the drive transmission, the solution shown in FIG. 8 differs from the above transmission arrangements. Instead of mechanical transmission, the arrangement of FIG. 8 comprises hydrostatic transmission. In that case, to at least one output axle 25 of the dividing gear 23 there is coupled a specific hydraulic pump 27 for drive transmission, by which is generated hydraulic pressure for drive transmission alone. This hydraulic pressure drives one or more hydraulic driving motors 28 which provide driving force for one or more wheels. The hydraulic driving motor 28 may be a hub motor, for instance, which is arranged in connection with a wheel axle, or alternatively, from the hydraulic driving motor 28 the driving force may be transmitted through mechanical transmission means 29, such as axles and the like, to the wheels 19. The transmission arrangement of an electric rock drilling rig, as shown in FIG. 8, is characterized in that the hydraulic pump of the hydraulic drilling system and the hydraulic pump of the drive equipment are arranged for being driven by at least one common electric motor and that by means of clutches the driving power is connectable to the hydraulic pump of the hydraulic drilling system and to the hydraulic pump of the drive equipment, each independently, from one or more common electric motors. Thus, the hydraulic pumps may operate nonsimultaneously or simultaneously, depending on the operating situations. It should be noted that hydrostatic drive transmission of a corresponding type may be applied in place of the mechanical drive equipment shown in FIGS. 1 to 3, 5 and 6.

In some cases, features disclosed in this application may be used as such, irrespective of other features. On the other hand, when necessary, the features disclosed in this application may be combined to provide various combinations.

The drawings and the related description are only intended to illustrate the idea of the invention. The details of the invention may vary within the scope of the claims.

The invention claimed is:

1. A rock drilling rig which is electrically driven comprising:
    a carriage having a plurality of wheels for moving the carriage;

at least one drilling boom movable by at least one boom actuator in relation to the carriage;

at least one drilling unit including a feed beam, a rock drilling machine supported by the feed beam, the rock drilling machine including at least a percussion device and a rotating device, and a feeding device for moving the rock drilling machine on the feed beam;

a hydraulic drilling system including at least one hydraulic pump having a pressure energy that drives at least one of the following drilling actuators: the percussion device, the rotating device, the feeding device, and the boom actuator, the hydraulic drilling system converting potential energy of the rock drilling rig to pressure energy during a downhill period of transfer drive; and a drive equipment including at least one electric drive motor and mechanical drive transmission means for transmitting driving power from the drive motor to the wheels, wherein the hydraulic pump of the hydraulic drilling system and the mechanical drive transmission of the drive equipment are driven by at least one common electric motor and are each independently connectable and disconnectable by a clutch to be driven and not to be driven by the electric motor.

2. The rock drilling rig of claim 1, wherein the electric motor includes a rotor having a first end coupled to drive the drive transmission and a second end coupled to drive the hydraulic pump of the hydraulic drilling system.

3. The rock drilling rig of claim 1, wherein the rock drilling rig includes a gear box having at least one input axle and at least one output axle, the electric motor being coupled to the input axle of the gear box for transmitting driving power to the gear box, and wherein the drive transmission and the hydraulic pump of the hydraulic drilling system are coupled to the output axles of a gear box of the drive equipment for receiving the driving power of the electric motor.

4. The rock drilling rig of claim 1, wherein the rock drilling rig includes at least two electric motors which are common to the drive equipment and the hydraulic drilling system.

5. The rock drilling rig claim 1, further comprising at least one compressor, the compressor being coupled to be driven by the electric motor common to the hydraulic drilling system and the drive equipment, transmission of driving power to the compressor being connected and disconnected independently by the clutch.

6. A method for transmission in an electric rock drilling rig, the method comprising the steps of:

moving a carriage of the rock drilling rig by drive equipment that includes at least one electric drive motor;

transmitting the driving power generated by the drive motor by mechanical drive transmission means to the wheels of the carriage;

drilling boreholes in a rock using drilling actuators in the drilling;

driving at least one hydraulic pump by at least one electric motor and providing pressure energy for the hydraulic drilling system;

driving with the pressure energy of the hydraulic drilling system at least one of the following drilling actuators: a percussion device, a rotating device, a feeding device, a boom actuator;

transmitting the driving force from a common electric motor to the hydraulic pump of the hydraulic drilling system and to the mechanical drive transmission of the drive equipment;

controlling independently, by means of clutches, the connection and disconnection of the hydraulic drilling system and the mechanical drive transmission to be driven by the common electric motor; and connecting the hydraulic drilling system during a downhill period of transfer drive and converting potential energy of the rock drilling rig to pressure energy.

7. The method of claim 6, further comprising the step of controlling the rotation speed and power of the common electric motor in a stepless manner by means of a frequency converter.

* * * * *